United States Patent
Sekiguchi et al.

(10) Patent No.: US 8,938,354 B2
(45) Date of Patent: Jan. 20, 2015

(54) DRIVING SUPPORT APPARATUS FOR VEHICLE

(71) Applicant: Fuji Jukogyo Kabushiki Kaisha, Tokyo (JP)

(72) Inventors: Hiroyuki Sekiguchi, Tokyo (JP); Tasuku Maruyama, Tokyo (JP); Hiroki Kato, Tokyo (JP); Eiji Shibata, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 57 days.

(21) Appl. No.: 13/827,846

(22) Filed: Mar. 14, 2013

(65) Prior Publication Data

US 2013/0261951 A1    Oct. 3, 2013

(30) Foreign Application Priority Data

Mar. 29, 2012   (JP) ................................ 2012-077039

(51) Int. Cl.

| | | |
|---|---|---|
| G08G 1/16 | (2006.01) | |
| B60T 7/12 | (2006.01) | |
| B60T 8/172 | (2006.01) | |
| B60T 7/22 | (2006.01) | |

(52) U.S. Cl.
CPC . B60T 8/172 (2013.01); B60T 7/22 (2013.01); *B60T 2201/022* (2013.01)
USPC ............... 701/301; 701/36; 701/70; 340/436

(58) Field of Classification Search
None
See application file for complete search history.

(56) References Cited

U.S. PATENT DOCUMENTS

| | | | | |
|---|---|---|---|---|
| 6,056,374 | A * | 5/2000 | Hiwatashi | 303/193 |
| 6,275,772 | B1 * | 8/2001 | Sugimoto et al. | 701/301 |
| 8,306,718 | B2 * | 11/2012 | Kubo et al. | 701/96 |
| 2002/0091479 | A1 * | 7/2002 | Maruko et al. | 701/96 |
| 2008/0234907 | A1 * | 9/2008 | Labuhn et al. | 701/70 |
| 2009/0038873 | A1 * | 2/2009 | Lucas et al. | 180/275 |
| 2009/0248270 | A1 * | 10/2009 | Sekiguchi | 701/96 |
| 2009/0319148 | A1 * | 12/2009 | Kubo et al. | 701/96 |
| 2010/0023226 | A1 * | 1/2010 | Ito | 701/46 |
| 2010/0082251 | A1 * | 4/2010 | Kogure | 701/301 |
| 2012/0078483 | A1 * | 3/2012 | Yajima et al. | 701/73 |
| 2012/0221209 | A1 * | 8/2012 | Tatsukawa | 701/42 |
| 2012/0239265 | A1 * | 9/2012 | Kato et al. | 701/70 |

FOREIGN PATENT DOCUMENTS

JP    2010-260504 A    11/2010

* cited by examiner

*Primary Examiner* — James Trammell
*Assistant Examiner* — Demetra Smith-Stewart
(74) *Attorney, Agent, or Firm* — McDermott Will & Emery LLP

(57) ABSTRACT

There is provided a driving support apparatus for a vehicle. A driving control unit determines whether or not a three-dimensional object ahead is a three-dimensional object having high reliability as a control object for an automatic brake control based on a condition set beforehand, when possibility of collision between the vehicle and the three-dimensional object ahead is determined to be high. When the reliability of the three-dimensional object ahead as the control object is determined to be low and the amount of increase in the accelerator opening degree is equal to or larger than a set value, the driving control unit cancels the execution of the automatic brake control.

3 Claims, 4 Drawing Sheets

DRIVING SUPPORT APPARATUS FOR VEHICLE

CROSS-REFERENCE TO RELATED APPLICATIONS

The present application claims priority from Japanese Patent Application No. 2012-077039 filed on Mar. 29, 2012, the entire contents of which are hereby incorporated by reference.

BACKGROUND OF THE INVENTION

1. Field of the Invention

The present invention relates to a driving support apparatus that applies an automatic brake, which is independent of a driver's brake operation, to a three-dimensional object in front of a vehicle.

2. Description of the Related Art

There have recently been proposed various driving support apparatuses for a vehicle for avoiding collision, and have been put to practical use. Such a driving support apparatus performs an automatic brake control, in which an automatic brake that is independent of a driver's brake operation is applied, when there is high possibility of collision of the vehicle against an obstacle such as another vehicle.

For example, Japanese Unexamined Patent Application Publication No. 2010-260504 describes a technique in the driving support apparatus of this type. In this technique, by setting such that a support operation for avoiding a contact is easy to be operated executed) to hasten an operation timing of an automatic brake control when a width of a connection road connected to a road on which a vehicle runs is equal to or lower than a predetermined threshold value and the driver has poor visibility near the connection road, the driver can be prevented from being irritated about the start of the support operation for avoiding the contact and the support operation for avoiding the contact can be started quickly at an appropriate timing.

In the driving support apparatus described above, the driver might determine from his/her sense that the collision against the obstacle can be avoided even if the automatic brake control is executed because it is determined that the possibility of the collision against the obstacle is high under control.

In order to solve this problem, for example, it may be determined that the driver intends to positively increase speed when an acceleration opening degree is equal to or higher than a set threshold value and the automatic brake control may be canceled to match the control and the driver's feeling.

However, when the automatic brake control is executed in a state in which an accelerator pedal is fully depressed, such as in the case where the vehicle runs on a climbing lane, it may be difficult to correctly determine the driver's intention of canceling the automatic brake control based on the accelerator opening degree. On the other hand, when the threshold value of the accelerator opening degree for canceling the automatic brake control is set to be high, the effectiveness of determining the cancel of the automatic brake control may be poor.

BRIEF SUMMARY OF THE INVENTION

The present invention is accomplished in view of the above-mentioned circumstance, and aims to provide a driving support apparatus for a vehicle that can precisely cancel unnecessary automatic brake control in response to driver's intention.

A first aspect of the present invention provides a driving support apparatus for a vehicle including: a three-dimensional object detecting unit for detecting three-dimensional object ahead information; a collision possibility determining unit for determining a possibility of collision between the vehicle and a three-dimensional object ahead; a brake control unit for executing an automatic brake control in order to prevent the collision against the three-dimensional object ahead when the possibility of the collision between the vehicle and the three-dimensional object is high; a reliability determining unit for determining whether or not the three-dimensional object ahead is a three-dimensional object having high reliability as a control object for the automatic brake control based on a condition set beforehand; and a canceling unit for canceling execution of the automatic brake control when it is determined that the reliability of the three-dimensional object as the control object is low and an amount of increase in an accelerator opening degree is not less than a set value in case where it is determined that the possibility of the collision against the three-dimensional object ahead is high.

DETAILED DESCRIPTION OF THE INVENTION

Figure 1:
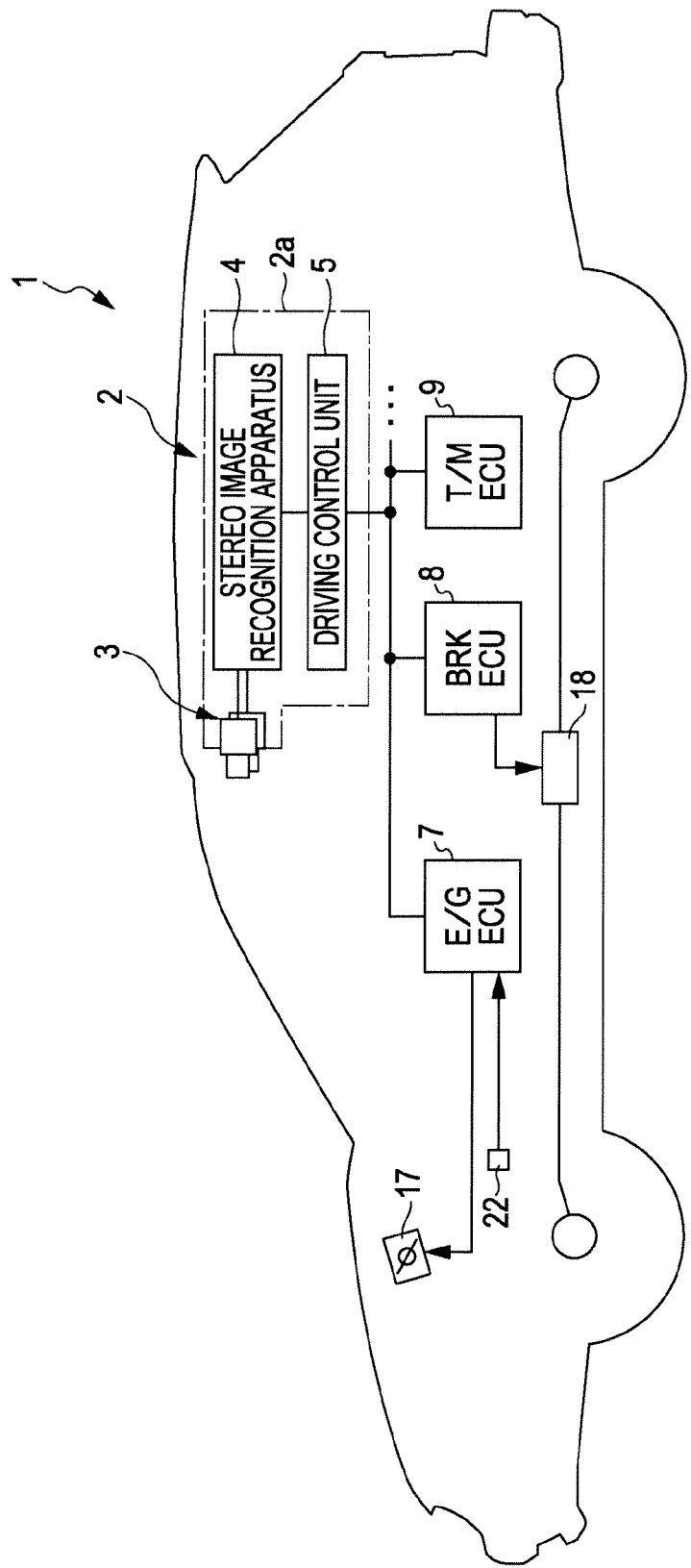
FIG. 1 is a schematic diagram illustrating a configuration of a driving support apparatus mounted on a vehicle.
Figure 2:
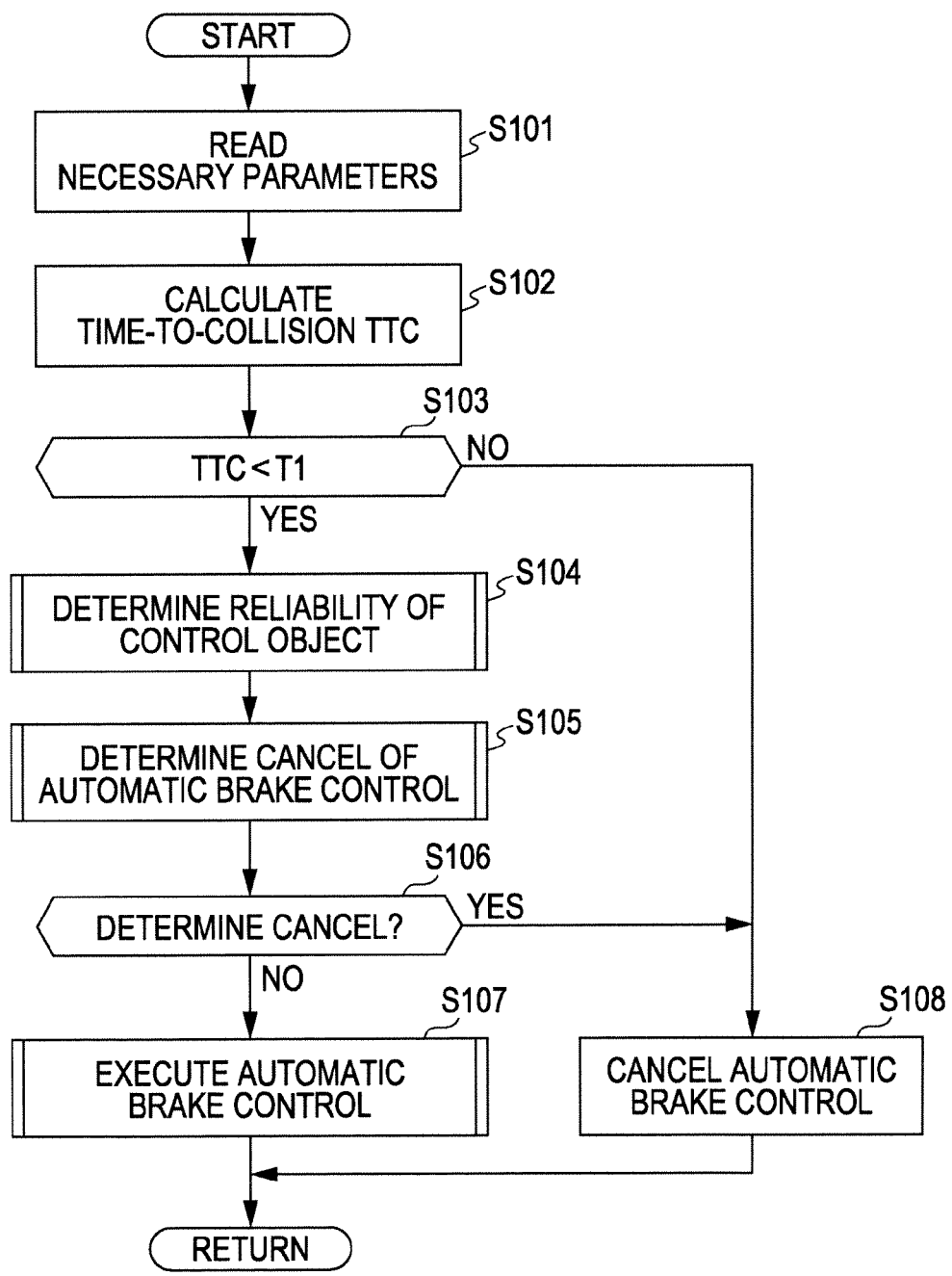
FIG. 2 is a flowchart illustrating an automatic brake control execution determining routine.
Figure 3:
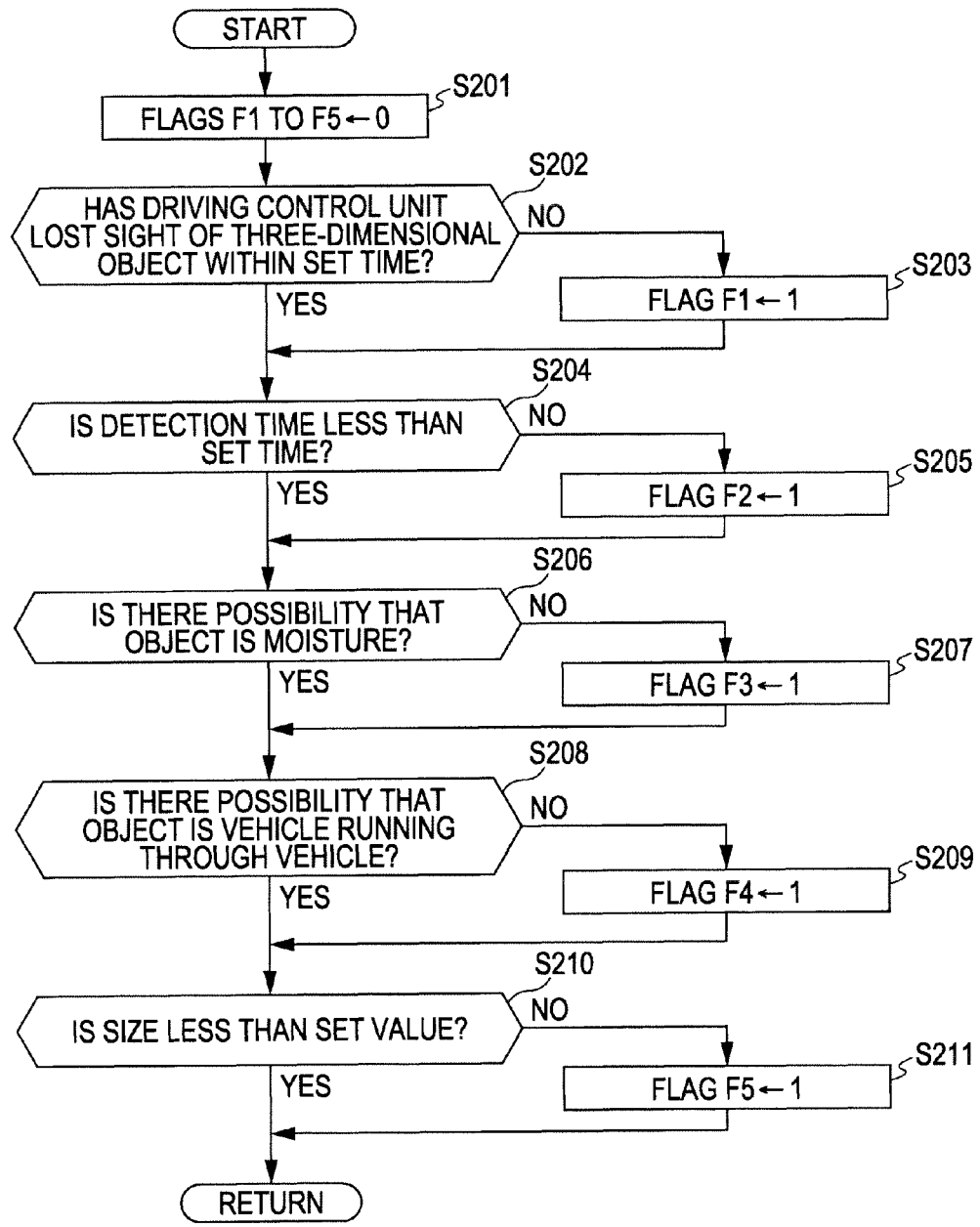
FIG. 3 is a flowchart illustrating a sub-routine for determining reliability of a control object.
Figure 4:
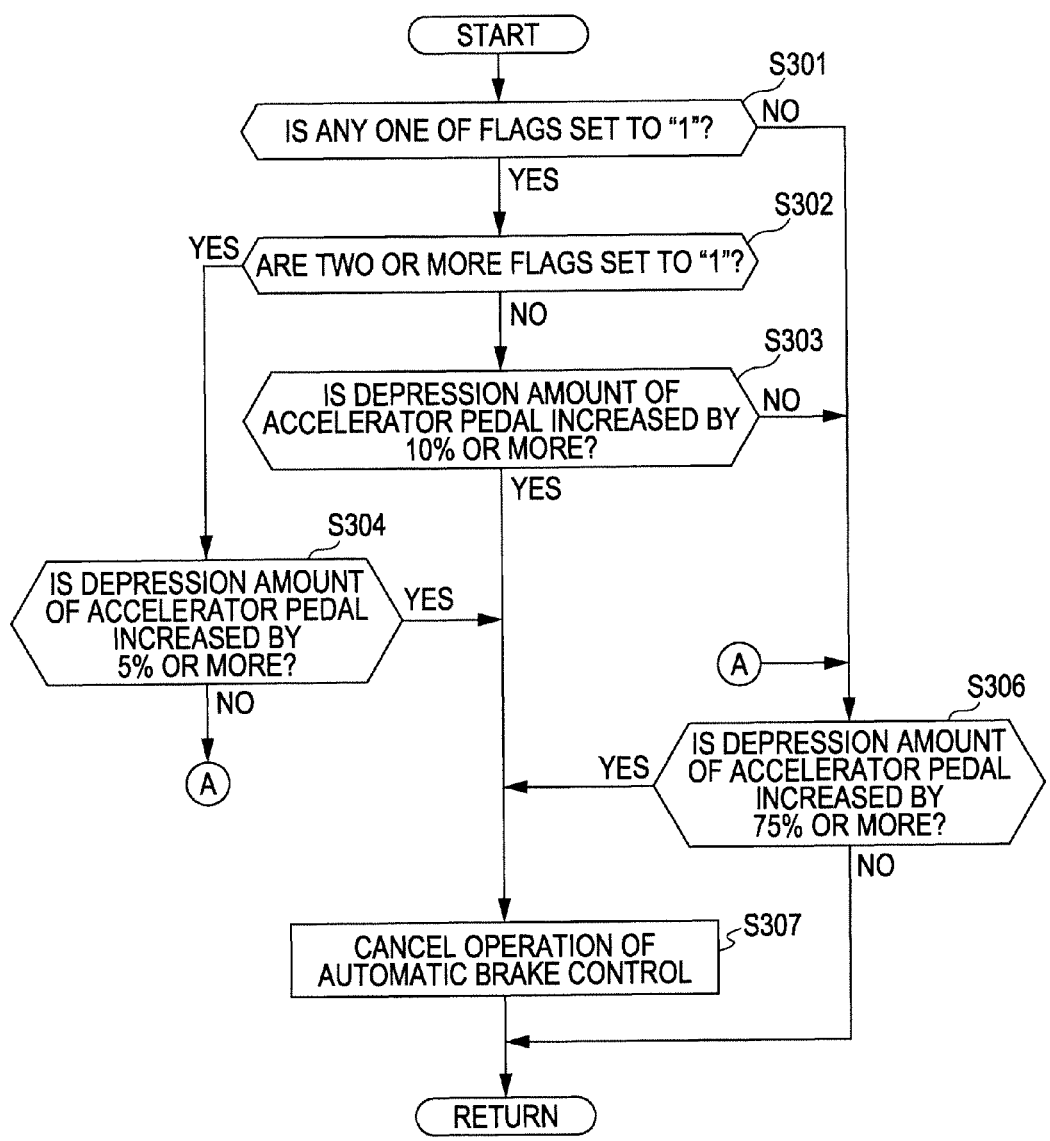
FIG. 4 is a flowchart illustrating a sub-routine for determining a cancel of the automatic brake control.

An embodiment of the present invention will be described below with reference to the drawings. The accompanying drawings are related to the embodiment of the present invention, in which FIG. 1 is a schematic configuration diagram of a driving support apparatus mounted on a vehicle; FIG. 2 is a flowchart illustrating an automatic brake control execution determining routine; FIG. 3 is a flowchart illustrating a sub-routine for determining reliability of a control object; and FIG. 4 is a flowchart illustrating a sub-routine for determining a cancel of the automatic brake control.

In FIG. 1, a vehicle 1 such as an automobile includes a driving support apparatus 2 that has a collision avoidance function for avoiding collision. The driving support apparatus 2 executes an automatic brake control by applying an automatic brake independent of a driver's brake operation when the possibility of the collision against a three-dimensional object ahead, such as a vehicle ahead, is high.

A main part of the driving support apparatus 2 includes a stereo camera assembly 2a having, for example, a stereo camera 3, a stereo image recognition apparatus 4, and a driving control unit 5 which are integrally formed. Various vehicle-mounted control units such as an engine control unit (E/G_ECU) 7, a brake control unit (BRK_ECU) 8, and a transmission control unit (T/M_ECU) 9 are connected to the driving control unit 5 in the stereo camera assembly 2a so as to communicate with each other.

The stereo camera 3 includes a set of right and left CCD cameras using solid state imaging devices such as charge-coupled devices (CODs), for example, as a stereo optical system. The set of CCD cameras are attached on front portions of a ceiling of a compartment with a predetermined distance therebetween, capture images of external subjects in stereo from different points of view, and output the captured image information to the stereo image recognition apparatus 4.

For example, the image information from the stereo camera 3 and the speed V of the vehicle from the T/M_ECU 9 are input to the stereo image recognition apparatus 4. The stereo image recognition apparatus 4 recognizes front information, such as data of a three-dimensional object or white-line data, in front of the vehicle based on the image information from the stereo camera 3, and estimates a road on which the vehicle 1 runs based on the recognized information (for example, estimates the road based on the driving condition of the vehicle or the white line). The stereo image recognition apparatus 4 then determines a driving region based on the road on which the vehicle 1 runs (e.g., determines the region with width of 1 m on each left and right side from the road on which the vehicle 1 runs as the driving region). When a three-dimensional object is present on this driving region, the three-dimensional object closest to the vehicle 1 is extracted as a control object that is determined to have possibility of collision against the vehicle 1.

The image from the stereo camera 3 is processed by the stereo image recognition apparatus 4 as described below. Firstly, the stereo image recognition apparatus 4 generates range data from stereoscopic images ahead of the vehicle 1, which are captured by the stereo camera 3, according to a principle of triangulation from a deviation amount between corresponding positions. A known grouping process is performed to the range data, and the range data is compared to data of three-dimensional road shape or data of three-dimensional object, which are stored in advance. Thus, data of white line, data of sidewall such as a guard rail or a curb present along a road, and data of three-dimensional object such as a vehicle or pedestrian are extracted. As for the three-dimensional object data, the distance to the three-dimensional object and a temporal change of this distance (the relative speed with respect to the vehicle 1) are obtained, and, particularly, the three-dimensional object closest to the vehicle on the driving region described above is extracted as the control object. The three-dimensional object (three-dimensional object ahead) extracted as the control object includes not only a moving object such as a vehicle ahead but also various three-dimensional objects that stand still on the driving region such as a power pole.

When the three-dimensional object that is the control object is extracted by the stereo image recognition apparatus 4, the driving control unit 5 executes a collision avoidance control (a precrash control) to the control object as one of driving support controls.

In the collision avoidance control, the driving control unit 5 calculates time-to-collision TTC (TTC=relative distance/relative speed), which is a time until the vehicle collides against the control object, based on the relative distance and the relative speed between the vehicle 1 and the control object, and determines the possibility of collision against the control object based on the time-to-collision TTC, for example. When determining that the possibility of collision against the control object is high, the driving control unit 5 executes step by step an alarm control and an automatic brake control, for example.

The alarm control is executed first, when the driving control unit 5 determines that there is a possibility of collision against the control object. When the TTC is a set threshold value T0 (e.g., T0=2.0 seconds), a driver's attention is drawn to the control object by an alarm, a display on a meter, or the like, so that the alarm control urges the driver to carry out the collision avoidance operation such as the steering operation and the brake operation.

The automatic brake control is executed when the appropriate collision avoidance operation by the driver is not executed in response to the alarm control. This control is executed when it is determined that the TTC becomes equal to or shorter than a set threshold value T1 (e.g., T1=1.5 seconds) and the possibility of collision against the control object is high. In the automatic brake control, an engine brake is applied under the control to a throttle valve 17 via the E/G_ECU 7. When it is determined that sufficient braking force for avoiding the collision against the control object cannot be obtained only by the engine brake, automatic brake is applied by the control of the outputted hydraulic pressure from a brake booster 18 via the BRK_ECU 8.

In order to cancel the automatic brake control executed as described above according to a driver's intension, the driving control unit 5 determines whether the automatic brake control has to be canceled or not based on an accelerator opening degree $\theta$ detected by an accelerator opening degree sensor 22. During the determination for the cancel of the automatic brake control, the driving control unit 5 determines whether or not the three-dimensional object ahead that is currently extracted is an object having high reliability as the control object for the automatic brake control, i.e., determines whether or not the three-dimensional object ahead is an appropriate object as the control object for the automatic brake control. When it is determined that the TTC becomes equal to or shorter than the set threshold value T1 and the possibility of collision against the control object is high, the driving control unit 5 cancels the automatic brake control when determining that the reliability of the three-dimensional object ahead as the control object is low and determining that the amount of increase $\Delta\theta$ of the accelerator opening degree $\theta$ is not less than a set value (i.e., when the depression amount of the accelerator pedal by the driver increases by a set value or more during execution of the automatic brake control). When the accelerator opening degree $\theta$ is almost full (e.g., $\theta$=70% or more), the driving control unit 5 exceptionally cancels the automatic brake control even if the reliability of the three-dimensional object ahead as the control object is determined to be high.

The driving control unit 5 according to the present embodiment has plural check items for determining whether or not the three-dimensional object ahead has high reliability as the control object. These items are roughly classified into the items relating to the detection state of the three-dimensional object ahead and the items relating to the detected three-dimensional object ahead itself. As for the detection state of the three-dimensional object ahead, the driving control unit 5 determines whether or not it has lost sight of the three-dimensional object ahead and whether or not the detection time is sufficient. As for the three-dimensional object ahead itself, the driving control unit 5 determines whether or not the three-dimensional object ahead has a possibility of being moisture, whether or not it may be a vehicle running through the vehicle 1, and whether or not a size is less than a set value. When at least one of these check items satisfies the condition condition set in advance, the driving control unit 5 determines that the reliability of the three-dimensional object ahead as the control object is low.

As described above, in the present embodiment, the stereo camera 3 and the stereo image recognition apparatus 4 realize a function as a three-dimensional object information detection unit, and the driving control unit 5 realizes functions of a collision possibility determining unit, a brake control unit, a reliability determining unit, and a canceling unit.

Next, the determination, made by the driving control unit 5, as to whether the automatic brake control is executed will be described according to an automatic brake control execution determining routine illustrated in FIG. 2. This routine is repeatedly executed at an interval of a preset time. When the routine is started, the driving control unit 5 firstly reads necessary parameters, i.e., the three-dimensional object ahead information that is the control object (e.g., a relative distance d between the vehicle 1 and the obstacle, a moving speed Vf of the obstacle, a deceleration of of the obstacle, a lap ratio Rr between the obstacle and the vehicle 1, and the like), the speed V of the vehicle, and the accelerator opening degree θ in step S101.

When proceeding to step S102 from step S101, the driving control unit 5 calculates the time-to-collision TTC (=(relative distance d)/(relative speed V−Vf)), and, in next step S103, checks whether or not the time-to-collision TTC is shorter than a set threshold time T1 (e.g., T1=1.5 seconds).

When determining in step S103 that the time-to-collision TTC is equal to or longer than the threshold time T1, the driving control unit 5 proceeds to step S108. When the automatic brake control is currently executed, the driving control unit 5 cancels the automatic brake control and then exits the routine.

When determining in step S103 that the time-to-collision TTC is less than the threshold time T1 and the possibility of collision against the three-dimensional object ahead is high, the driving control unit 5 proceeds to step S104 to determine the reliability of the three-dimensional object ahead as the control object. The reliability is determined in accordance with a flowchart of a sub-routine for determining the reliability of the control object illustrated in FIG. 3, for example. When the sub-routine is started, the driving control unit 5 firstly clears flags F1 to F5 described later to "0" in step S201 (F1←0, F2←0, F3←0, F4←0, F5←0).

Subsequently, in step S202, the driving control unit 5 checks whether it has lost sight of the three-dimensional object ahead, which is currently extracted as the control object, in the past within a set time (for example, 3 seconds in the past).

When determining in step S202 that it has lost sight of the three-dimensional object ahead in the past within the set time by one frame or more, the driving control unit 5 proceeds to step S203 to set the flag F1, which indicates that the reliability of the three-dimensional object ahead as the control object is low, to "1" (F1←1), and then the driving control unit 5 proceeds to step S204. That is, when the driving control unit 5 has lost sight of the three-dimensional object ahead in the past, the three-dimensional object ahead may be an object that is erroneously detected for some control reason even although the object does not exist in a real space. Therefore, the driving control unit 5 determines that the reliability of the three-dimensional object ahead, which has been lost sight in the past, as the control object is low, and sets the flag F1 for this determination to "1".

On the other hand, when determining in step S202 that the driving control unit 5 has not lost sight of the three-dimensional object ahead, the driving control unit 5 proceeds to step S204.

When proceeding to step S204 from step S202 or step S203, the driving control unit 5 checks whether or not an elapsed time (detection time) elapsed since the three-dimensional object ahead that is currently extracted as the control object is detected first is less than a set time (e.g., 3 seconds).

When determining in step S204 that the detection time of the three-dimensional object ahead is less than the set time, the driving control unit 5 proceeds to step S205 to set the flag F2, which indicates that the reliability of the three-dimensional object ahead as the control object is low, to "1" (F2←1), and then proceeds to step S206. When the detection time of the three-dimensional object ahead is short, it may be difficult to sufficiently check that the three-dimensional object ahead exists in a real space depending upon an environment outside the vehicle. Therefore, the driving control unit 5 determines that the reliability of the three-dimensional object ahead, which has short detection time, as the control object is low, and sets the flag F2 for this determination to "1".

On the other hand, when determining in step S204 that the detection time of the three-dimensional object ahead is equal to or longer than the set time, the driving control unit 5 proceeds to step S206.

When proceeding to step S206 from step S204 or step S205, the driving control unit 5 checks whether or not the three-dimensional object that is currently extracted as the control object may be moisture. When averages of the height and width of the three-dimensional object ahead change by a predetermined value or more in the set frame in the past, the driving control unit 5 determines that the three-dimensional object ahead may be moisture.

When determining in step S206 that the three-dimensional object ahead may be moisture, the driving control unit 5 proceeds to step S207 to set the flag F3, which indicates that the reliability of the three-dimensional object ahead as the control object is low, to "1" (F3←1) and then proceeds to step S208. That is, when the moisture is recognized as the three-dimensional object ahead, it is no problem even if the vehicle 1 collides against the moisture. The moisture is an inappropriate object to be controlled for the automatic brake control in most cases except for the case where an obstacle is present in the moisture. In such a case, the reliability is low, from the viewpoint of whether or not the moisture is appropriate as the control object for the automatic brake control, even if the moisture apparently exists as the three-dimensional object ahead. Therefore, the driving control unit 5 determines that the reliability of the three-dimensional object ahead as the control object is low when there is a possibility that the object ahead is moisture, and sets the flag F3 for this determination to "1".

On the other hand, when determining in step S206 that there is not possibility that the three-dimensional object ahead is moisture, the driving control unit 5 proceeds to step S208.

When proceeding to step S208 from step S206 or step S207, the driving control unit 5 checks whether or not there is a possibility that the three-dimensional object that is currently extracted as the control object is a vehicle running through the vehicle 1. The driving control unit 5 determines that there is a possibility that the three-dimensional object ahead is a vehicle running through the vehicle 1 when the three-dimensional object ahead has a speed component in the widthwise direction of the vehicle 1 and the lap ratio Rr between the three-dimensional object ahead and the vehicle 1 reduces.

When determining in step S208 that there is a possibility that the three-dimensional object ahead is a vehicle running through the vehicle 1, the driving control unit 5 proceeds to step S209 to set the flag F4, which indicates that the reliability of the three-dimensional object ahead as the control object is low, to "1" (F4←1) and then proceeds to step S210. When the three-dimensional object ahead is the vehicle running through the vehicle 1, the three-dimensional object ahead has to be monitored temporarily as the control object having high possibility of collision, but the possibility of collision can be eliminated soon. In such a case, the reliability can be low, from the viewpoint of whether or not the vehicle running through the vehicle 1 is continuously appropriate as the control object for the automatic brake control, even if the vehicle running through the vehicle 1 apparently exists as the three-dimensional object ahead. Therefore, the driving control unit 5 determines that the reliability of the three-dimensional object ahead as the control object is low when there is a possibility that the three-dimensional object is the vehicle running through the vehicle 1, and sets the flag F4 for this determination to "1".

On the other hand, when determining in step S208 that there is not possibility that the three-dimensional object ahead is the vehicle running through the vehicle 1, the driving control unit 5 proceeds to step S210.

When proceeding to step S210 from step S208 or step S209, the driving control unit 5 checks whether or not the size of the three-dimensional object that is currently extracted as the control object is less than a set value. When the width of the three-dimensional object ahead is less than a set width (e.g., 50 cm), the driving control unit 5 determines that the size of the three-dimensional object ahead is less than the set value. When the height of the three-dimensional object ahead is less than a set height, the driving control unit 5 can also determine that the size of the three-dimensional object is less than the set value.

When determining in step S210 that the size of the three-dimensional object ahead is less than the set value, the driving control unit 5 proceeds to step S211 to set the flag F5, which indicates that the reliability of the three-dimensional object ahead as the control object is low, to "1" (F5←1), and then exits the sub-routine. That is, when the size of the three-dimensional object is less than the set value, there is a high possibility that the vehicle 1 can avoid the collision against the three-dimensional object by the steering operation without relying on the application of brake. In such a case, the reliability is low, from the viewpoint of whether or not the three-dimensional object ahead is appropriate as the control object for the automatic brake control, even if the three-dimensional object ahead apparently exists. Therefore, the driving control unit 5 determines that the reliability of the three-dimensional object ahead as the control object is low when the size of the object is less than the set value, and sets the flag F5 for this determination to "1".

On the other hand, when determining in step S210 that the size of the three-dimensional object ahead is equal to or larger than the set value, the driving control unit 5 exits the sub-routine without executing any process.

When proceeding to step S105 from step S104 in the main routine in FIG. 2, the driving control unit 5 determines whether or not the automatic brake control should be canceled (the determination of cancel). The determination of cancel is made in accordance with a flowchart of a sub-routine for determining a cancel of the automatic brake control illustrated in FIG. 4. When the sub-routine is started, the driving control unit 5 checks whether or not at least one flag F of the flags F1 to F5 determined in step S104 is set to "1".

When determining in step S301 that at least one flag F of the flags is set to "1", the driving control unit 5 proceeds to step S302. When determining that none of the flags is set to "1" (i.e., all flags F are cleared to "0"), the driving control unit 5 proceeds to step S306.

When proceeding to step S302 from step S301, the driving control unit 5 checks whether or not two or more flags F of the flags F1 to F5 determined in step S104 are set to "1".

When determining in step S302 that two or more flags F are set to "1", the driving control unit 5 proceeds to step S304. When determining that two or more flags F are not set to "1" (i.e., only one flag F is set to "1"), the driving control unit 5 proceeds to step S303.

When proceeding to step S303 from step S302, the driving control unit 5 checks whether or not the depression amount of the accelerator pedal by the driver increases by 10% or more from the time when TTC<T1 is established till the present time, i.e., whether or not the amount of change $\Delta\theta$ of the accelerator opening degree $\theta$ since the determination that the possibility of collision against the three-dimensional object ahead is made is 10% or more, based on the accelerator opening degree $\theta$ detected by the accelerator opening degree sensor 22, for example.

When determining in step S303 that the depression amount of the accelerator pedal increases by 10% or more, the driving control unit 5 proceeds to step S307. When determining that the depression amount of the accelerator pedal does not increase by 10% or more, the driving control unit 5 proceeds to step S306.

When proceeding to step S304 from step S302, the driving control unit 5 checks whether or not the depression amount of the accelerator pedal by the driver increases by 5% or more from the time when TTC<T1 is established till the present time, i.e., whether or not the amount of change $\Delta\theta$ of the accelerator opening degree $\theta$ since the determination that the possibility of collision against the three-dimensional object ahead is made is 5% or more, based on the accelerator opening degree $\theta$ detected by the accelerator opening degree sensor 22, for example.

When determining in step S304 that the depression amount of the accelerator pedal by the driver increases by 5% or more, the driving control unit 5 proceeds to step S307. When determining that the depression amount of the accelerator pedal does not increase by 5% or more, the driving control unit 5 proceeds to step S306.

When proceeding to step S306 from step S301, step S303 or step S304, the driving control unit 5 checks whether or not the accelerator opening degree $\theta$ detected by the accelerator opening degree sensor 22 is equal to or more than 75%, i.e., whether or not the accelerator pedal is almost fully depressed.

When determining in step S306 that the depression amount of the accelerator pedal is less than 75%, the driving control unit 5 exits the sub-routine without executing any process. When determining that the depression amount of the accelerator pedal is equal to or larger than 75%, the driving control unit 5 proceeds to step S307.

When proceeding to step S307 from step S303, step S304, or step S306, the driving control unit 5 makes the determination as to whether or not the execution (operation) of the automatic brake control is canceled, and then, exits the sub-routine.

When proceeding to step S106 from step S105 in the main routine in FIG. 2, the driving control unit 5 checks whether or not the determination of canceling the execution of the automatic brake control is made in step S105.

When determining in step S106 that the determination of canceling the execution of the automatic brake control is not made, the driving control unit 5 proceeds to step S107 to execute the automatic brake control to the control object. Then, the driving control unit 5 exits the routine.

On the other hand, when determining in step S106 that the determination of canceling the execution of the automatic brake control is made, the driving control unit 5 proceeds to step S108 to cancel the execution of the automatic brake control that is currently executed, and then exits the routine.

According to the embodiment described above, when it is determined that the possibility of collision between the vehicle 1 and the three-dimensional object ahead is high, it is determined whether the three-dimensional object ahead has the high reliability as the control object for the automatic brake control based on the condition set beforehand. When the three-dimensional object ahead is determined to have low reliability as the control object and the amount of increase in the accelerator opening degree θ is not less than the set value, the execution of the automatic brake control is canceled. The execution of the unnecessary automatic brake control can be precisely canceled in response to the driver's intention.

Specifically, upon determining the cancel of the automatic brake control that is currently executed, not the mere accelerator opening degree θ, but the increase amount Δθ of the accelerator opening degree θ during the determination that the possibility of collision against the three-dimensional object ahead is high are monitored. Accordingly, the driver's intention of increasing speed can precisely be estimated even if the vehicle 1 runs on a climbing lane. Then, the reliability of the three-dimensional object ahead as the control object for the automatic brake control is determined, and the state that the reliability of the three-dimensional object ahead as the control object is low is added as the condition of canceling the automatic brake control. Thus, the driver's intention of canceling the automatic brake control can be precisely determined based on the relatively small amount of change Δθ of the accelerator opening degree θ. In other words, appropriateness of canceling the automatic brake control is independently determined based on the reliability of the three-dimensional object ahead as the control object, and the cancel of the automatic brake control is determined based on the reliability and the amount of increase Δθ of the accelerator opening degree θ. Thus, the cancel of the automatic brake control can be precisely determined based on the relatively small amount of increase Δθ of the accelerator opening degree θ without causing erroneous determination.

In this case, when the reliability of the three-dimensional object ahead as the control object is determined for plural items and the reliability is determined to be low for two or more items, the threshold value for the determination to the amount of increase Δθ of the accelerator opening degree θ is set to be lower than the case where the reliability is determined to be low for any one of the items. Thus, the driver's intension can be reflected more sensitively while the precision of determining the cancel of the execution of the automatic brake control is secured to some extent.

The present invention is not limited to the embodiment described above, and various modifications and changes are possible without departing from the technical scope of the present invention. The modifications and changes are also included in the technical scope of the present invention.

For example, in the embodiment described above, plural check items are set as the condition for determining whether or not the three-dimensional object ahead has reliability as the control object for the automatic brake control. However, the present invention is not limited thereto. The determination may be made based on only one item. It is obvious that the check items for determining the reliability are not limited to those described above.

Further, in the embodiment described above, the threshold value for the determination to the amount of increase Δθ of the accelerator opening degree θ is changed according to the number of the items for which the reliability is determined to be low. However, the present invention is not limited thereto. It is obvious that the uniform threshold value for the determination may be set regardless of the number of the items, for example.

The invention claimed is:

1. A driving support apparatus for a vehicle comprising:
   a three-dimensional object detecting unit for detecting three-dimensional object ahead information;
   a collision possibility determining unit for determining a possibility of collision between the vehicle and the three-dimensional object ahead;
   a brake control unit for executing an automatic brake control in order to prevent the collision against the three-dimensional object ahead when the possibility of the collision between the vehicle and the three-dimensional object is high;
   a probability determining unit for determining whether the three-dimensional object ahead detected by the three-dimensional object detecting unit is a three-dimensional object having low probability as a control object based on a condition set beforehand; and
   a canceling unit for canceling execution of the automatic brake control when it is determined by the probability determining unit that the three-dimensional object detected by the three-dimensional object detecting unit has low probability and an amount of increase in an accelerator opening degree is not less than a set value, even when it is determined that the possibility of the collision against the three-dimensional object ahead is high.

2. The driving support apparatus for a vehicle according to claim 1, wherein the canceling unit cancels the execution of the automatic brake control when the accelerator opening degree is equal to or more than a threshold value that is set to be almost fully open even if the probability determined for the three-dimensional object detected by the three-dimensional object detecting unit is higher than a probability set for canceling automatic brake control.

3. A driving support apparatus for a vehicle comprising:
   a three-dimensional object detecting unit for detecting three-dimensional object ahead information;
   a collision possibility determining unit for determining a possibility of collision between the vehicle and the three-dimensional object ahead;
   a brake control unit for executing an automatic brake control in order to prevent the collision against the three-dimensional object ahead when the possibility of the collision between the vehicle and the three-dimensional object is high; and
   a canceling unit for canceling execution of the automatic brake control when it is determined that the three-dimensional object detected by the three-dimensional object detecting unit is not an object that collision should be avoided and an amount of increase in an accelerator opening degree is not less than a set value, even when it is determined that the possibility of the collision against the three-dimensional object ahead is high.

* * * * *